United States Patent
Klarman et al.

(10) Patent No.: US 12,047,387 B2
(45) Date of Patent: Jul. 23, 2024

(54) DISTRIBUTED DIGITAL CURRENCY MINING TO PERFORM NETWORK TASKS

(71) Applicant: Northwestern University, Evanston, IL (US)

(72) Inventors: Uri Klarman, Evanston, IL (US); Marcel Flores, Los Angeles, CA (US); Aleksandar Kuzmanovic, Evanston, IL (US)

(73) Assignee: Northwestern University, Evanston, IL (US)

( * ) Notice: Subject to any disclaimer, the term of this patent is extended or adjusted under 35 U.S.C. 154(b) by 544 days.

(21) Appl. No.: 17/281,512

(22) PCT Filed: Oct. 7, 2019

(86) PCT No.: PCT/US2019/054951
§ 371 (c)(1),
(2) Date: Mar. 30, 2021

(87) PCT Pub. No.: WO2020/076679
PCT Pub. Date: Apr. 16, 2020

(65) Prior Publication Data
US 2022/0046027 A1 Feb. 10, 2022

Related U.S. Application Data (60) Provisional application No. 62/743,438, filed on Oct. 9, 2018.

(51) Int. Cl.
*H04L 9/40* (2022.01)
*H04L 9/32* (2006.01)
*H04L 9/00* (2022.01)

(52) U.S. Cl.
CPC ............ *H04L 63/12* (2013.01); *H04L 9/3239* (2013.01); *H04L 9/50* (2022.05); *H04L 2209/56* (2013.01)

(58) Field of Classification Search
CPC .............................. H04L 63/12; H04L 9/3239
See application file for complete search history.

(56) References Cited

U.S. PATENT DOCUMENTS 9,009,162 B1 * 4/2015 Luo .................... G06F 16/31
707/740
9,195,640 B1 * 11/2015 Donneau-Golencer ......................
G10L 15/00

(Continued)

FOREIGN PATENT DOCUMENTS

WO    WO 2017/195160 A1    11/2017

OTHER PUBLICATIONS

The International Search Report and the Written Opinion issued on Jan. 7, 2020 for International Patent Application No. PCT/US2019/054951; pp. 1-9.

(Continued)

*Primary Examiner* — Viral S Lakhia
(74) *Attorney, Agent, or Firm* — Bell & Manning, LLC (57) ABSTRACT

A system to generate a web index includes a computing device having a processor and a memory operatively coupled to the memory. The computing device is configured to access a plurality of webpages through a network along a directed route. The computing device is also configured to generate an index corresponding to the plurality of webpages. The computing device is further configured to distribute a digest corresponding to the index to one or more additional computing devices in the network.

16 Claims, 7 Drawing Sheets

(56) References Cited

U.S. PATENT DOCUMENTS

| | | | |
|---|---|---|---|
| 9,614,869 B2* | 4/2017 | Prieto Alvarez | H04L 63/1458 |
| 10,181,948 B1* | 1/2019 | Nenov | G06F 9/44505 |
| 10,834,095 B2* | 11/2020 | Irazabal | H04L 63/12 |
| 10,949,511 B2* | 3/2021 | Frederick | G06Q 50/01 |
| 10,951,395 B2* | 3/2021 | Liu | H04L 9/0637 |
| 11,153,069 B2* | 10/2021 | Kurian | H04L 9/3242 |
| 11,188,897 B2* | 11/2021 | Kurian | G06Q 20/382 |
| 11,387,994 B2* | 7/2022 | Wang | H04L 12/2816 |
| 2005/0141519 A1 | 6/2005 | Rajgopal et al. | |
| 2005/0149500 A1 | 7/2005 | Marmaros et al. | |
| 2009/0083293 A1 | 3/2009 | Albrecht et al. | |
| 2010/0158242 A1 | 6/2010 | Asher | |
| 2012/0179900 A1 | 7/2012 | Temporelli | |
| 2012/0310914 A1 | 12/2012 | Khan | |
| 2013/0226898 A1 | 8/2013 | Brawer et al. | |
| 2014/0181122 A1* | 6/2014 | Jain | G06F 16/328 707/748 |
| 2017/0329852 A1* | 11/2017 | Li | G06F 16/9532 |
| 2018/0109541 A1* | 4/2018 | Gleichauf | H04W 12/06 |
| 2018/0285399 A1* | 10/2018 | Altizer | G06F 16/2458 |
| 2018/0302417 A1* | 10/2018 | Wilson | H04L 9/3271 |
| 2019/0163887 A1* | 5/2019 | Frederick | H04L 9/3239 |

OTHER PUBLICATIONS

Ricardo Baeza-Yates et al., "Challenges on Distributed Web Retrieval." In: 2007 IEEE 23$^{rd}$ international Conference on data engineering. May 2007 Retrieved on Dec. 4, 2019 from https://www.researchgate.net/profile/Carlos_Castillo/publication/4251016_Challenges_on_Distributed_Web_Retrieval/links/0046353a6c598d2b57000000/Challenges-on-Distributed-Web-Retrieval.pdf>entire document.

"Steem—An incentivized, blockchain-based, public content platform." Aug. 2007; pp. 1-32. www.steem.io/SteemWhitePaper.pdf.

S. Barber et al., "Bitter to Better—How to Make Bitcoin a Better Currency." In International Conference on Financial Cryptography and Data Security (2012), Springer, pp. 399-414.

P. Boldi et al., Ubicrawler: A Scalable Fully Distributed Web Crawler. Software: Practice and Experience, vol. 34, No. 8, (2004); pp. 711-726.

* cited by examiner

DISTRIBUTED DIGITAL CURRENCY MINING TO PERFORM NETWORK TASKS

CROSS-REFERENCE TO RELATED APPLICATION

This application is a National Stage of International Application No. PCT/US19/54951, filed Oct. 7, 2019, which claims the priority benefit of U.S. Provisional Patent Application No. 62/743,438, filed Oct. 9, 2018, the entire disclosures of which are incorporated by reference herein.

GOVERNMENT LICENSE RIGHTS

This invention was made with government support under grant number CNS1810582 awarded by the National Science Foundation. The government has certain rights in the invention.

BACKGROUND

There are four major Internet search engines in use today. The companies behind these major search engines hold a unique position in enabling the use of the Internet, as they alone direct over 98% of Internet users to the content they seek with the use of proprietary indices. While the contribution of these companies is undeniable, their design is necessarily affected by their economic interests, which may or may not align with those of the users. This potential misalignment raises concerns regarding their effect on the availability of information around the globe. While multiple academic and commercial projects have aimed to distribute and democratize network searching, they have failed to gain much traction, mostly due to inferior results and lack of incentives for participation.

SUMMARY

An illustrative system to generate a web index includes a computing device having a processor and a memory operatively coupled to the memory. The computing device is configured to access a plurality of webpages through a network along a directed route. The computing device is also configured to generate an index corresponding to the plurality of webpages. The computing device is further configured to distribute a digest corresponding to the index to one or more additional computing devices in the network.

An illustrative method of performing web indexing includes accessing, by a networking interface of a computing device, a plurality of webpages along a directed route. The method also includes generating, by a processor of the computing device, an index corresponding to the plurality of webpages. The method further includes distributing, by the network interface, a digest corresponding to the index to one or more additional computing devices in the network.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Networking tasks, such as web crawling, webpage scraping, web indexing, routing measurements, as well as latency and bandwidth measurements, are used by content delivery networks (CDNs), cloud services, search engines, Internet service providers (ISPs), researchers, etc. Traditionally, networking tasks are considered difficult to perform and hard to estimate, since their results depend heavily on the network characteristics of an observer. At the same time, incentivizing users to leverage their positions in the network to perform these networking tasks remains a challenging open problem. Described herein is an alternative and comprehensive solution to this problem. Specifically, it is shown how the incentive model of a blockchain distribution system/network can be used to crowdsource complex networking tasks. Considering the large space of networking tasks which can be outsourced, experiments were conducted with respect to a particular sub-problem in this domain, which is web indexing. In alternative implementations, different networking tasks such as those mentioned above, can also be performed using the techniques described herein. As discussed herein, continuous web indexing enables web search, and is arguably first among the possible networking tasks in terms of real-world influence.

The Web search market, for both mobile and desktop clients, is extremely consolidated and dominated by Google®, which holds a share of over three-quarters of the market. Furthermore, the 4 largest search engines, Google®, Bing®, Baidu®, and Yahoo®, together control over 98% of the market. Each one of these search engines maintains an index of the webpages on the Internet and their content in order to return appropriate responses to client queries. As an example, Google®, which research has shown to hold the largest index, maintains an index of approximately 46.5 billion webpages.

One of the key barriers that hinders the proliferation of a larger number of search engines is the daunting, multibillion dollar task of crawling and indexing the exabyte-scale web space. Hence, this task is carried out by a small number of powerful players capable of committing substantial resources to conduct continuous 24/7 web crawling and indexing. Despite efforts to democratize this space (i.e., promote the use of a distributed, objective, and unbiased index), the use of such distributed systems had not become common. This is mostly due to inferior results associated with small web indices used by such systems, induced by the lack of economic incentives for participation in distributed web crawling. The limited use of such systems is also due to the small-scale nature of the communities of users interested in collaborative web indexing.

Described herein are a method and system for crowdsourcing complex networking-intensive tasks using an incentives based model. More specifically, described herein is a novel distributed digital-currency, referred to as Webcoin, which utilizes networking resources rather than computational resources, and can only be mined through web indexing (or other assigned network task). Webcoin provides both the incentives and the ability to create large-scale indices, which are freely available to competing services and the public. As discussed in detail below, the Webcoin design overcomes numerous unique challenges, such as index verification, scalability, and the ability of nodes to actively manipulate webpages. To validate the system, 200 fully-functioning Webcoin nodes were deployed to demonstrate system operations with the use of low bandwidth. Webcoin is a novel distributed digital currency which crowdsources networking tasks. Specifically, Webcoin rewards web crawling, scraping, and indexing, by producing money for those who participate in these tasks. The Webcoin system is the first such system to incentivize networking tasks, and is able to produce multibillion scale web indices within a matter of days.

Bitcoin was the first peer-to-peer currency to gain considerable traction globally. Bitcoin is a mechanism to maintain and update a ledger of transactions in a distributed manner. Its security and integrity are achieved through a process called mining, where every node (i.e., miner) conducts intensive computations in an attempt to add a valid block of transactions to the ledger. To incentivize mining, each block produces new Bitcoins which are awarded to its creator. Webcoin utilizes an incentivizing mechanism to perform non-computational tasks. Unlike Webcoin, which aims to democratize the search engine industry, the unparalleled computation power involved in Bitcoin mining, currently at 15-20 exa-hashes per second, serves no other purpose beyond Bitcoin. For comparison, Bitcoin is currently consuming roughly 43.7 terawatt hours (TWh) of energy annually, which is similar to the annual energy consumption of Hong Kong.

One of the goals of Webcoin is to force miners to crawl and index the web instead of conducting purposeless computations. However, whereas creating a valid Bitcoin block is computationally hard, and thus the production of such a block is a proof-of-work of the computational resources invested, it can be challenging to use the content of indexed webpages as a proof-of-work, while providing the same security guarantees as a network like Bitcoin. This is because both legitimate and fraudulent webpages are susceptible to manipulation. To overcome this challenge, the proposed system decouples the webpage indexing proof-of-work from the success of a node, remodeling it as a necessary but insufficient requirement for successful Webcoin mining. Any incentive for miners to manipulate webpages is therefore removed, as such efforts will not affect their chances to be rewarded.

A second major challenge in the design of Webcoin is the collection of web indices from all Webcoin miners, not only from the miners which successfully mined a Webcoin block. Unlike Bitcoin, where only the miner which had successfully mined a new block publishes it, Webcoin can force every single Webcoin miner to publish its index, so that the entire product of the indexing effort is made available to all. In one embodiment, this is accomplished by requiring miners to publish a hash of their web index as a way to qualify for mining Webcoin, and to upload their compressed web index to ensure their competitiveness.

A third challenge in developing a system such as Webcoin is associated with web index validation, which refers to ensuring that the web indices submitted by miners are accurate. Contrary to Bitcoin, where a proof-of-work validation lasts several nano-seconds, validating all indices does not scale. Thus, a mechanism is provided that incentivizes miners to submit valid web indices. In one embodiment, once a miner mines a new Webcoin, its webpage indexing proof-of-work is validated. As a result, while only a small fraction of submitted indices is actually verified, the scheme ensures that nodes have no chance of winning Webcoins if they do not properly index the web. This guarantees the validity of the web index collectively produced by the miners.

Overall, the Webcoin system is a novel primitive to incentivize the crowdsourcing of complex network tasks. The Webcoin system is the first digital currency to enable and incentivize the distributed creation of a verifiable large scale web indexing. The Webcoin system is also the first digital currency to utilize networking resources for its mining process, rather than processing, memory, or storage resources. Also described herein are key challenges of migrating cryptographic mining primitives to the networking domain, and provision of novel techniques to address them. For validation, a network of 200 fully-functioning Webcoin nodes was deployed to analyze and prove their practicality and scalability. While it is possible for resource-rich entities to amass resources (e.g., acquire a large number of IPs) to participate in Webcoin's mining, such entities do not jeopardize the Webcoin security model, which is described in detail below.

As discussed above, Bitcoin is the first crypto-currency to gain considerable traction globally, with a market capitalization of over 100 billion USD. While other crypto-currencies exist, and more are suggested by academia, many of these alternatives offer an incremental variation of the principles on top of which Bitcoin is built. Bitcoin is a mechanism to maintain and update a ledger of transactions in a distributed manner. The ledger, called the blockchain, includes blocks, each of which contains a group of transactions. The order of blocks determines the order of the transactions. Each person or entity wishing to possess bitcoins must create a wallet that includes a private key and a public key, and Bitcoin transactions detail the transfer of bitcoins between these wallets.

The security and integrity of the Bitcoin system is achieved through a process called mining. Against common belief, mining is not simply the mechanism used to produce bitcoins. Rather, mining produces bitcoins in order to incentivize nodes to create more blocks, and through that, to create a single secure history of all transactions. In order to mine a new block, nodes participate in a unique kind of contest. Every mining node (miner) exhaustively searches for a binary value (referred to as a nonce), which, when hashed along with the previous block and the transactions of the new block, produces a value (i.e., digest) which must be smaller than Bitcoin's target.

Once found, the miner will publish the block, which includes the nonce, and it will be accepted by all nodes as the next block in the blockchain. The incentive for nodes to mine blocks arrives from the block's single coinbase transaction, which creates new Bitcoins and transfers them to the wallet of the miner. It is noted that the nonce cannot be used with any other coinbase transaction, e.g., one which transfers the reward to another wallet. This is because such a change will change the digest the nonce yields, which would almost certainly invalidate the block. The nonce is thus used as the miner's proof-of-work, and the investment of computational resources can be proven statistically, by presenting a nonce for which the miner is being rewarded.

Bitcoin's security is derived from the resources invested in mining, and from the definition of the longest blockchain as the single legitimate blockchain, if multiple versions are presented. If a dishonest miner were to replace a block with a modified block, including or excluding transactions in its favor, the hash value of the modified block will change, and the dishonest node will have to exhaustively search for a new nonce. More importantly, the change will also invalidate any consecutive block because each block's hash value depends on the block preceding it, and new nonces will need to be found sequentially. The dishonest node will have to search for a new nonce for every invalidated block, in order to make the modified blockchain as legitimate as the original one. At the same time, all other nodes invest their resources in finding the next nonce and lengthening the blockchain. Thus, the dishonest node will have to control enough resources to produce nonces at a higher rate than all of the other nodes combined (i.e., the majority of computational power in the system). The likelihood of a dishonest node's success is statistical in nature, and diminishes with the number of blocks it is required to re-validate. Thus, while the transactions of the last several blocks are considered less secure, transactions included in earlier blocks are considered immutable.

Bitcoin is capable of overcoming a wide variety of scenarios which might have compromised the blockchain integrity and the consensus of the nodes, by incorporating the concept of forks. A fork is defined to be the scenario where multiple legitimate versions of the blockchain exist. An example scenario is when two blocks containing different transactions have been mined simultaneously, and have both propagated through the network. The blockchain will experience temporary ambiguity regarding which transactions have indeed taken place. However, once additional blocks are mined, one version of the blockchain will become longer than the other, and therefore legitimate. At such time, miners will switch from mining the shorter version to the longer, as there is a higher likelihood for the blockchain to converge to the longer version, and also because blocks mined for the shorter version and their rewards will be discarded.

The mining process in a system such as Bitcoin consumes growing amounts of resources. The energy consumed in the mining process can be viewed as energy invested in the security of Bitcoin. However, the increased investment does not translate to additional functionality, which bears asking how much energy should be invested for additional security. One approach to reduce the energy footprint of a crypto-currency is to shift from Bitcoin's Proof-of-Work (PoW) strategy to the use of a Proof-of-Stake (PoS) strategy. In PoS, the exhaustive search for a nonce is eliminated, and the eligibility to produce a new block is distributed among those who hold crypto-currency funds. The more coins one holds, the higher its probability to produce the next block. However, the security guarantees and economical model of PoS systems remains to be proven. Another approach aims to replace the computationally intense hashing with alternatives that involve frequent memory access or storage access. Webcoin takes a different approach, aiming to crowdsource a beneficial work that has significant real-world implications, to miners. In addition, the footprint is considerably reduced by networking tasks, as they involve long waiting times and infrequent computations.

A main goal in the creation of Webcoin is to incentivize distributed web indexing, in a manner which enables unrestricted access to the resulting indices. To achieve this goal, Webcoin migrates from the computational domain to the networking domain, and rewards miners for performing web indexing. The Webcoin system is unlike any other digital currency that has been developed. To achieve its goals in practice, Webcoin provides security and integrity guarantees to ensure that users are comfortable with the system. Webcoin is also scalable to a large network (e.g., the size of Bitcoin or larger), without increasing the load on the miners as the index size reaches a large scale. Webcoin is also configured to not increase the load on web servers as the number of miners increases. To achieve high participation, the Webcoin system design allows and incentivize the participation of miners with limited networking capacities, i.e., with low bandwidth and high latency. Large user participation is important in gaining momentum with the popularity of the system, particularly in early days of the system adoption. Additionally, unlike Bitcoin in which only the first node to mine a block publishes it for propagation to the entire Bitcoin network, Webcoin not only allows, but in some embodiments forces every single Webcoin miner to publish its index. As a result, the entire product of the indexing effort is made available to all users and to the general public if desired. Moreover, Webcoin aims to verify the correctness indices, and to incentivize miners to reliably report the results of their indexing.

With respect to the indexing itself, Webcoin can use any of the numerous existing indexing frameworks known in the art. The indexing framework utilized can depend on the desired features of the resulting index. Similarly, any of multiple different frameworks can be utilized for scalable and distributed web crawling. In one implementation, Webcoin can utilize a Scrapy framework, which is a powerful open-source framework for web scraping as known in the art. Alternatively, a different framework may be used with the capacity to filter on the fly content-generating webpages, spam, crawler traps, etc. As described herein, the system is not intended to be limited by a specific indexing framework or a specific web crawling framework.

Figure 1:
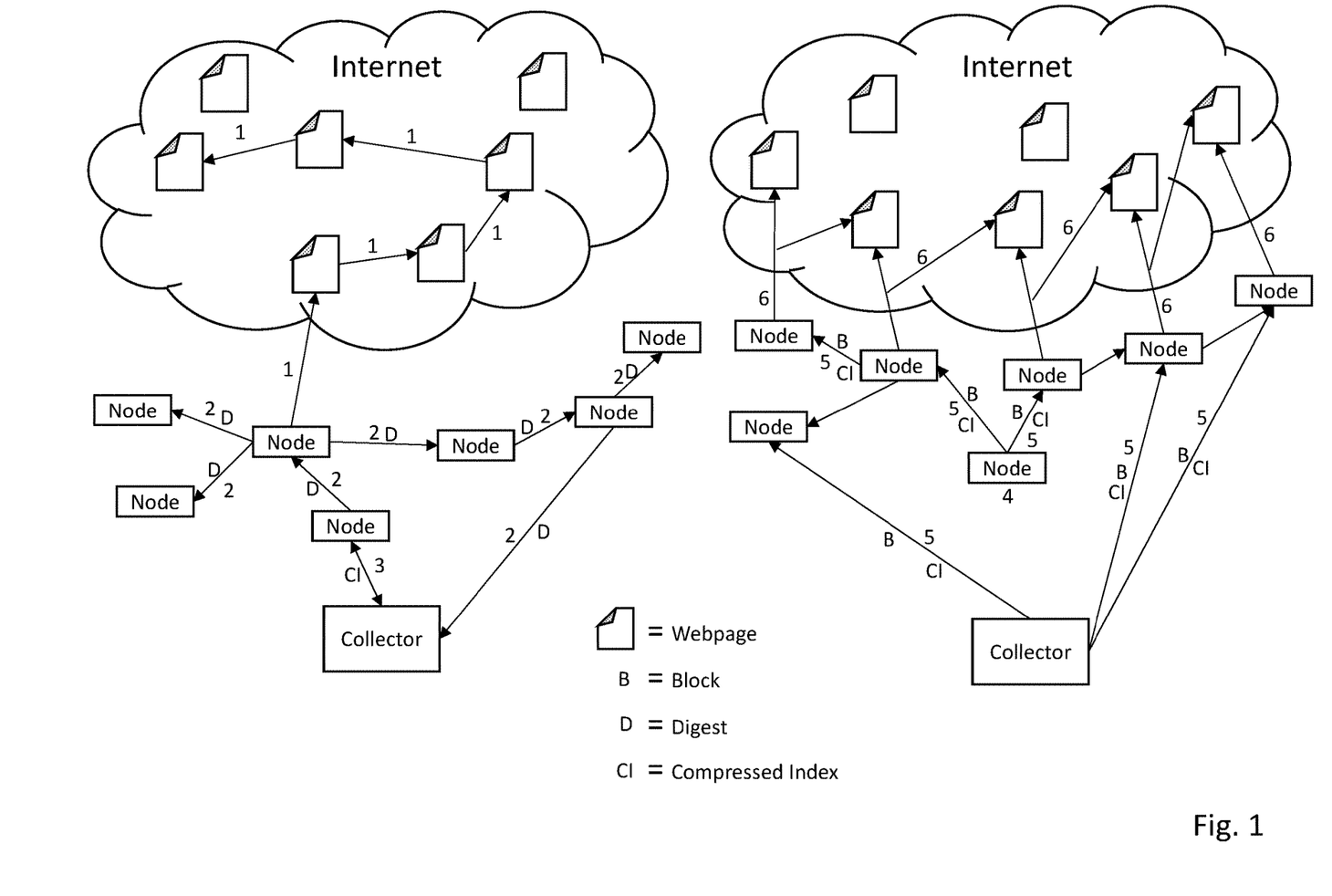
FIG. 1 depicts a system for performing Webcoin mining in accordance with an illustrative embodiment.

FIG. 1 depicts a system for performing Webcoin mining in accordance with an illustrative embodiment. In FIG. 1, numeral 1 represents a miner crawling webpages on the Internet along a directed path. The numeral 2 depicts the miner indexing the crawled webpages, hashing the index, and propagating a resulting digest to peer nodes. The numeral 3 depicts collectors requesting and receiving compressed indices from miners. The numeral 4 depicts waiting, by a miner, until some miner becomes eligible to mine a new block. In numeral 5, the eligible miner propagates a block and index, accelerated by collectors. In numeral 6, each miner verifies the block, compares the index to a past digest, and verifies a subset of the webpages in the index. These processes are described in more detail below.

In a first operation to perform Webcoin mining, a miner crawls the web and indexes the webpages identified in the crawl. However, in one embodiment, a miner cannot choose its webpages arbitrarily. Rather, the miner begins its crawl based on previously mined blocks, and each miner is directed to a different crawl path, unknown a priori. Web crawling in such a manner prevents miners from downloading all needed webpages in parallel, which would place miners with limited resources at a disadvantage. Once crawling is performed, the miner hashes the indices they produced, and publishes the resulting digests to their peers for propagation to the network. This commits each miner to the digest it has published, and the miner will be asked to provide the index which produces this digest in order to be rewarded. It is computationally infeasible to first publish a digest and only then to find an index which produces it.

Nodes interested in collecting indices are referred to as collectors, and can request that miners provide their indices. The collectors can be new search engines, existing search engines aiming to cut costs, companies performing analysis of big data from the web, researchers from both industry and academia, individuals, etc. Complying with such requests from collectors increases a miner's competitiveness, and is in the best interest of the miner. In at least one embodiment, collectors earn no Webcoins for their work. Instead, their reward is the access to a global web index without investing significant resources to obtain it.

In an illustrative embodiment, each miner then waits to become eligible to mine the next block, or most likely, to receive a new block mined by the first miner to become eligible. A miner becomes eligible to mine a new block after a minimal time period has passed since the previous block mining, and also once hashing the current UTC time (e.g., in seconds), the IP address of the miner, and elements from previous blocks produces a small enough digest. The first eligible miner produces a block, which is propagated to all miners alongside that miner's index. Collectors propagate blocks and indices as well, accelerating their propagation and reducing fork probability. Each miner to receive the block will verify it, and ensure that the miner of the block indeed controls the IP address used for mining. Each node validates the index accuracy by sampling a small subset of its webpages, and by verifying that its hashing matches the digest published by its miner while the previous block was mined. Thus, web indexing allows miners to participate in the mining of the following block, not the current one.

In an illustrative embodiment, each Webcoin miner is required to crawl a minimum number of webpages over a set duration of time. As an example, the minimum number of webpages can be 1000 and the set duration of time can be every 10 minutes. In alternative embodiments, a different minimum number of webpages can be used, such as 500, 800, 1200, 1500, etc. Similarly, a different duration of time may be used, such as every 5 minutes, every 8 minutes, every 12 minutes, every 15 minutes, etc. As the number of miners increases, so does the likelihood of different miners indexing the same webpages. To increase the efficiency of the system, and to allow for a truly scalable web indexing system, Webcoin limits the possible webpages each miner can crawl and index. Specifically, miners are forced to comply with the restrictions described below for their index to be considered valid.

First, miners are asked to create their indices using continuous crawls, i.e., their indices must contain one or more series of webpages, each referencing those following it. Each index specifies the order of its crawls in a designated data structure. Second, the first webpage of each crawl is selected from among the indices accompanying the previous two blocks in the blockchain. An additional crawl is only valid if the current crawl had exhausted its webpages. Third, in order for a webpage to be included in a crawl, the hashing of the miner's IP address, the previous block's digest, the webpage's URL, and the URLs of all the webpages which led to it via crawl must be smaller than $(2^{256}-1)/10$ in one embodiment. Simply put, only 10% of the webpages a miner encounters are valid for it to index, and their validity differs across miners and for different crawl paths. Necessarily, the eligible webpages are unknown to a miner ahead of time. Alternatively, a different maximum hash value and/or percentage may be used.

Given the power-law distribution of the Internet, a collective 'Brownian crawling motion' will effectively cover the most prominent portions of the web, assuming crawlers have the ability to systematically avoid, on-the-fly, content generating webpages, spam, and crawler traps.

Once crawling is completed, the miner hashes the produced indices and publishes the resulting digest. While the proposed mining scheme incentivizes miners to share their indices, which is a goal of the system, such undiscriminating propagation is wasteful because most miners have no interest in collecting the indices for their own purposes. Additionally, only one (winning) miner, or at most very few, will mine a new block and their index is of interest for all miners, since it needs to be validated. To prevent the unnecessary networking overhead induced by index propagation from each node, the system asks miners to hash their indices and publish only the resulting 256 bit digests and their IP addresses, in order to become eligible to mine a block. By design, the proposed Webcoin system supports one miner per network address translation (NAT), to avoid manipulations with port numbers. Additionally, miners are prevented from reporting a digest in hopes of creating an index to match it at a later time, as finding an input to produce a desired digest is computationally infeasible.

System nodes which have an interest in collecting indices, referred to as collectors, can gain knowledge of all the indices which were produced during the mining of the previous block, through the propagation of the digests corresponding to the indices. Collectors may request the miners to provide them with their indices, and such collaboration is facilitated based on their respective interests. While collectors have an interest in receiving indices for their own goals (e.g., collect and assemble a global large scale index), miners have an interest to minimize the time that it takes for their block and index to reach the majority of nodes. A shorter propagation time reduces the chances for a competing block, mined at similar time, to reach the majority first, and thus prevents the block from being included in the blockchain. Miners can reduce their propagation time by sending their index to collectors prior to the mining completion. To be useful to miners, collectors secure sufficient upload capacity and maintain a long outbound connections list of their own.

In an illustrative embodiment, a Webcoin block includes a batch of transactions, as in Bitcoin. However, unlike Bitcoin miners, which exhaustively test different binary values at unparalleled rates, the success of a Webcoin miner depends on predetermined elements. The direct result is that the target of the proposed system is of significantly smaller scale than the target in Bitcoin, regardless of the number of miners. It is thus important to prevent the miner of the current block from directly affecting the mining of the blocks following it. Otherwise, the miner will be able to manipulate the current block, ensuring the ability of the miner to mine the next block as well, a task easily computed for the target of the proposed system.

To prevent miners from manipulating blocks, Webcoin utilizes SHA-256 double hashing to hash 4 elements. Alternatively, a different type of hashing and/or a different number of hashed elements may be used. First, every block $B_i$ contains an additional field, which contains the digest yielded by hashing of the entire block preceding it by 32 blocks ($B_{i-32}$), denoted $TX_{hash}$. Second, every block $B_i$ contains an additional 1 bit field, denoted anybit, which has a value that is randomly selected by the miner, and is introduced to counter pre-computation of future blocks. Third, Webcoin utilizes the current time, in seconds, based on the Coordinated Universal Time (UTC). While highly accurate time synchronization in distributed systems requires non-negligible effort, synchronization in the order of seconds is easily achievable, and has been previously used by similar systems to produce timestamps for blocks. Lastly, the success of each miner also depends on the hashing of its IP address, and it must prove its ability to communicate through that IP address in order to validate its block. The mining and block validation procedures of the proposed system are discussed in more detail below.

Upon the mining of a new block in the proposed system, the block is propagated to all miners, followed by its index. A block can be propagated via peer nodes and/or via collectors. Indeed, in case the miner has already sent the index to the collector, upon the successful mining of a new block, such a miner may not be required to send the index again. Instead, the miner may be asked to only send the newly-mined block. At the same time, a collector can refuse to accept blocks unless the collector's original requests for indices are answered. In one embodiment, a collector refuses to accept blocks by not being included on (or removing themselves from) an outbound connections list of the miner.

During the propagation, every miner that receives the block, either from a collector or another peer, validates the block. As part of the validation, a node queries the miner of the block to verify that the miner indeed controls the Internet Protocol (IP) address used for mining. Following the block validation and the propagation of both the block and index, each miner statistically validates the index.

Validating that the miner of a new block has indeed performed web crawling and indexing prior to its mining raises several main challenges. One challenge is overcoming the natural churn of the Internet. Webpages must remain stable enough to allow their validation for at least several minutes after they have been indexed. Otherwise, an index might be found accurate by the first miners to validate it, and inaccurate by those following. A second challenge is to avoid placing a heavy load on the webpages included in the index, as a large number of clients, e.g., 100K or more miners, may attempt to contact them over a short period of time, a scenario known as a 'flash event.' A third challenge is to reduce the validation time to a minimum, so that even low-bandwidth miners will be able to perform the validation in a timely manner.

To overcome these challenges, the proposed system uses statistical index validation. Statistical index validation involves validating only a small subset of webpages, but is still able to accurately predict the index validity. In experiments conducted using the proposed system, it has been found that only 1.97% of webpages change within 4 minutes, and of the remaining, only 0.231% change within the following 30 minutes. When allowing for inaccuracies in up to 3.5% of webpages without deeming an index invalid, not a single index failed its validation in the conducted experiments. In alternative embodiments, a different percentage of inaccuracies may be allowed in an index, such as 1%, 2%, 4%, 5%, etc.

Webcoin thus relaxes the accuracy requirements of miners in some embodiments, and asks every miner to randomly sample 30 (out of 1000) webpages from the index, download them, and validate that they were properly indexed. In one embodiment, in the event that up to 1 webpage is inaccurate, the miner will deem the index valid. If more than 6 webpages are found to be inaccurate, the index is deemed invalid. If 2-6 inaccurate webpages are found, the process (of randomly sampling new 30 webpages) can be repeated, up to 4 times, after which it will be deemed invalid if 12 or more inaccurate webpages were encountered, and valid otherwise. This technique is described in more detail below. In alternative embodiments, different values and/or techniques may be used to determine validity.

In order to enable a high user participation, which is an important component to crowdsourcing web indexing and democratizing web search, Webcoin aims to preserve and enhance equality among miners. To that end, Webcoin prevents miners from following the mining of one block with the mining of a consecutive block for a certain period of time. The period of time can be 180 seconds in one embodiment. Alternatively, other values may be used such as 30 seconds, 60 seconds, 120 seconds, 240 seconds, etc. Such a time period allows miners with lower bandwidth to validate the previous block and produce a new index, and stay on par with miners of higher bandwidth.

To test and evaluate the system, a network of 200 Webcoin system nodes was deployed. In one implementation, a system node can be built on top of Pyminer, which is a python implementation of a Bitcoin miner. In the evaluation, miners were programmed to commence mining Webcoins using random transactions, using blocks with an average size of 700 Kilobytes (KB). Miners utilize download bandwidths ranging between 0.5 and over 300 Megabits per second (Mbps), with a median of 19.68 Mbps. In an illustrative embodiment, each miner can have 8 outbound connections, i.e., 8 peer miners to which it propagates blocks and indices, and the outbound connections can be selected randomly from among all other nodes. Alternatively, a different number of outbound connections may be used.

Figure 2:
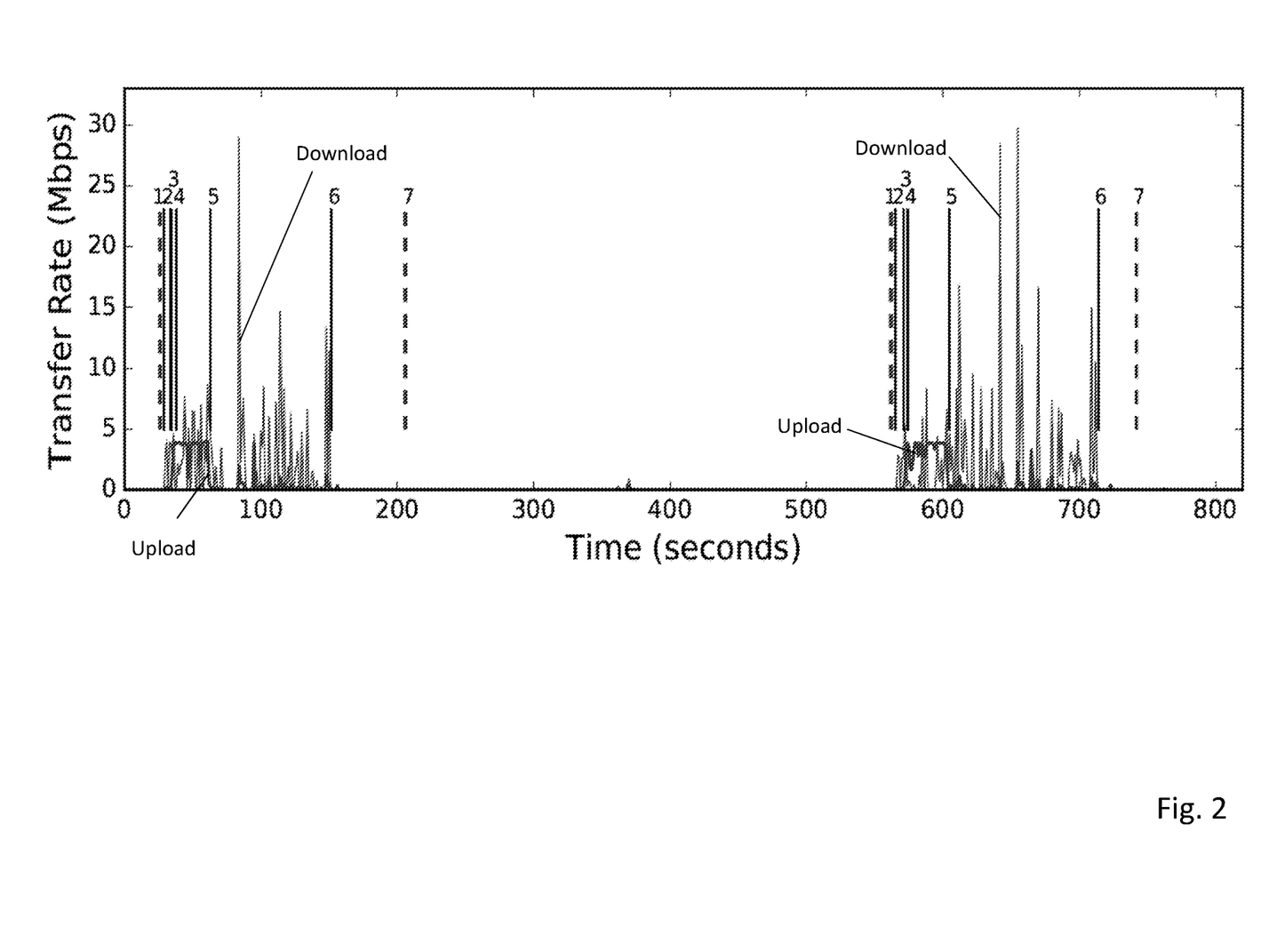
FIG. 2 presents the networking usage of a single Webcoin miner during the mining of two consecutive blocks, using an index size of 1000 webpages, in accordance with an illustrative embodiment.

FIG. 2 presents the networking usage of a single Webcoin miner during the mining of two consecutive blocks, using an index size of 1000 webpages, in accordance with an illustrative embodiment. In FIG. 2, dashed lines mark the periods in which mining is prohibited (between 1 and 7), and numbers mark the events of the mining process. Specifically, the numbers mark the mining process as follows: (1) block is mined by another miner, (2) block and index download from peers, (3) block and index propagation on the upload direction, and index validation on the download direction, (4) web crawling and indexing, (5) block and index propagation completion, (6) web crawling completion, and (7) block mining begins.

As shown, FIG. 2 presents both download and upload bandwidth utilization, as well as the events occurring during the mining process. The networking usage plot provides several insights regarding the dynamics of mining in the system, and the resources it consumes. First, it is noted that the seven events which are involved in the mining of a single block, are divided into 3 phases, each with different characteristics. The first phase starts with the mining of a new block by a peer miner (denoted Line 1), which indicates the beginning of the 180 seconds (or other) time span in which blocks cannot be mined. The block's mining is closely followed by the arrival of the block and its index (denoted Line 2). Upon successful validation of the block, the block and index are propagated to the peers of the miner, using upload bandwidth (denoted Line 3). At the same time, the miner utilizes its download bandwidth to validate the index it has received, with its completion denoted as Line 4. These events, which make up the first phase of the mining, occur in a rapid succession, and in an illustrative embodiment are completed within 12 seconds from the mining of the new block. Alternatively, a different amount of time may be used, such as 10 seconds, 8 seconds, 14 seconds, etc.

In the second phase, with the successful validation of the index (Line 4), the miner begins its web crawling and indexing on the download direction, while in parallel it continues to propagate the block and the index it had received to its peers. The propagation is completed at Line 5, and the web crawling and indexing at Line 6, marking the end of the second phase. The second phase is considerably longer than the first, and it is there where the miner invests networking resources at a moderate level, such that even low-bandwidth miners can fairly compete.

In the third phase, upon completing the web crawl (Line 6), the miner propagates the hashing of the index to its peers, and awaits to resume mining with the passing of a predetermined time period (e.g., 180 seconds) from the mining of the previous block, denoted Line 7. This phase requires very little resources, as the miner can quickly perform all involved computations, and is only asked to propagate the small hashes of indices produced by its peers. This phase will continue until the successful mining of the next block, denoted as Line 1 at 563 seconds. It is important to understand that the index hash, pushed by the miner at Line 6, at time 152 seconds, makes the miner eligible to compete in the next block (i.e., the one for which mining starts at Line 7 at 743 seconds). A miner thus has a sufficient time to crawl the web and propagate its index hash.

The conducted experiments also evaluate the ability of a miner to crawl the web and to produce indices of sufficient size in a timely manner, as to be useable in the context of block mining time scales. Four index sizes of 100, 500, 1000, and 2000 webpages per index were utilized, and the performance of the miners was measured over a period of one week for each of the index sizes. The above index sizes were chosen with the desire to allow even miners of limited capacity, i.e., in the order of 1 Mbps, to participate, while still producing large-scale indices. Indeed, if 100K miners were to participate using an index of 100 webpages, the resulting index will reach Google®'s index size approximately within a month. If an index of 1000 webpages is be used, a similarly sized index can be obtained within 3 days.

Figure 3:
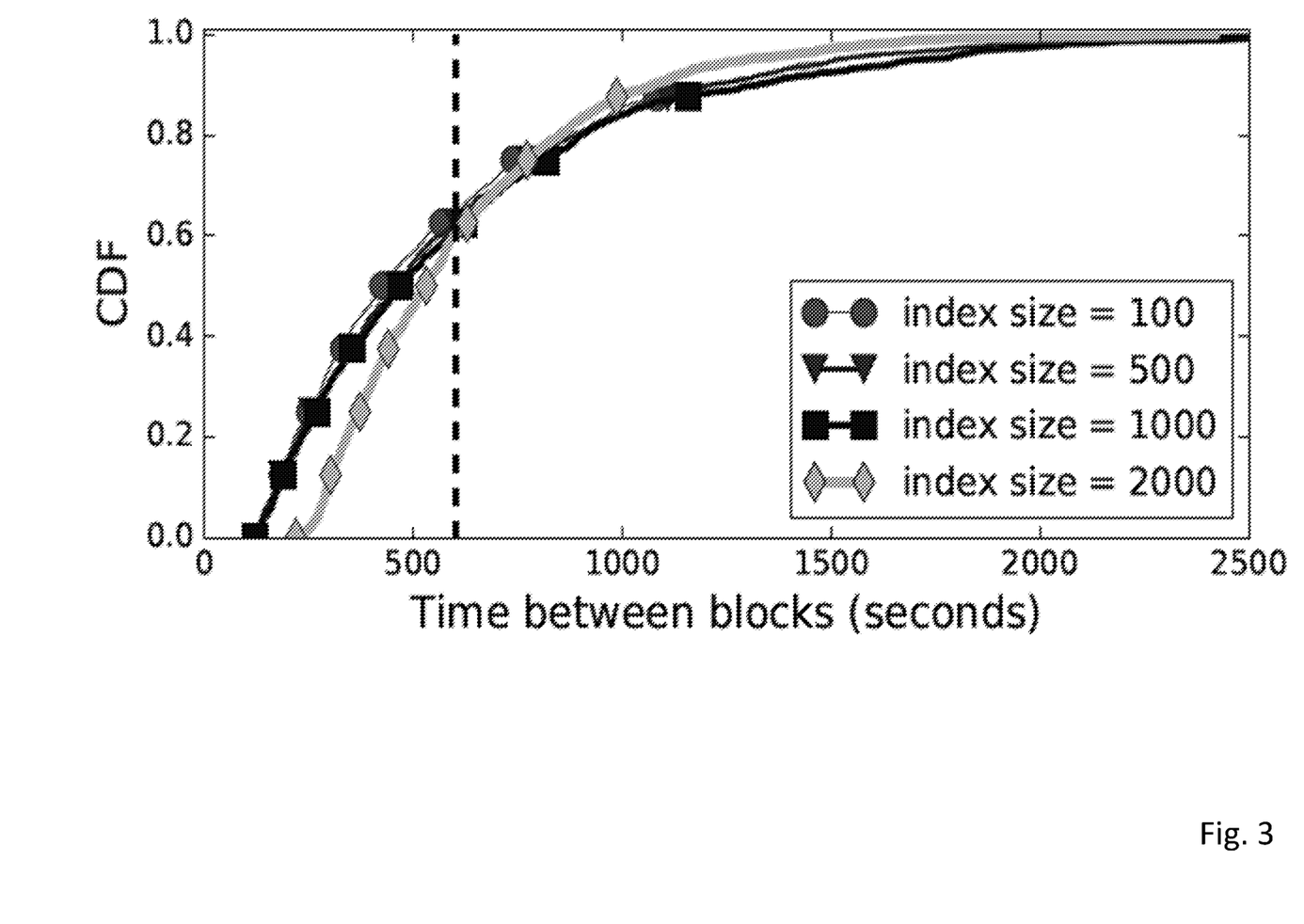
FIG. 3 presents a cumulative distribution function (CDF) of the time intervals between the mining of new blocks for each of the index sizes tested in accordance with an illustrative embodiment.

FIG. 3 presents a cumulative distribution function (CDF) of the time intervals between the mining of new blocks for each of the index sizes tested in accordance with an illustrative embodiment. In FIG. 3, the vertical line represents the target at 600 seconds. In one embodiment, the system adjusts its difficulty target in an attempt to reach an average of 10 minutes. Alternatively, a different average value may be used. It is evident that the tested index sizes allow for mining in the desired time scales. Moreover, the variance of inter-block times for the proposed system is smaller than that of other systems such as Bitcoin.

Another phenomena which can be observed is the similar distribution of mining times experienced by smaller index sizes, in contrast to that of indices having 2000 webpages. As the larger indices require longer times to produce, mining time as a whole lengthens. To compensate for this lengthening, the proposed system can increase its target value, which makes mining easier by relaxing the validity requirements. In an illustrative embodiment, the target value is increased in order to maintain an average mining time of 600 seconds. Alternatively, other values may be used, such as 400 seconds, 500 seconds, 700 seconds, etc. The combined effect results in a denser distribution function, as the same number of blocks are mined during a shorter time interval.

Figure 4:
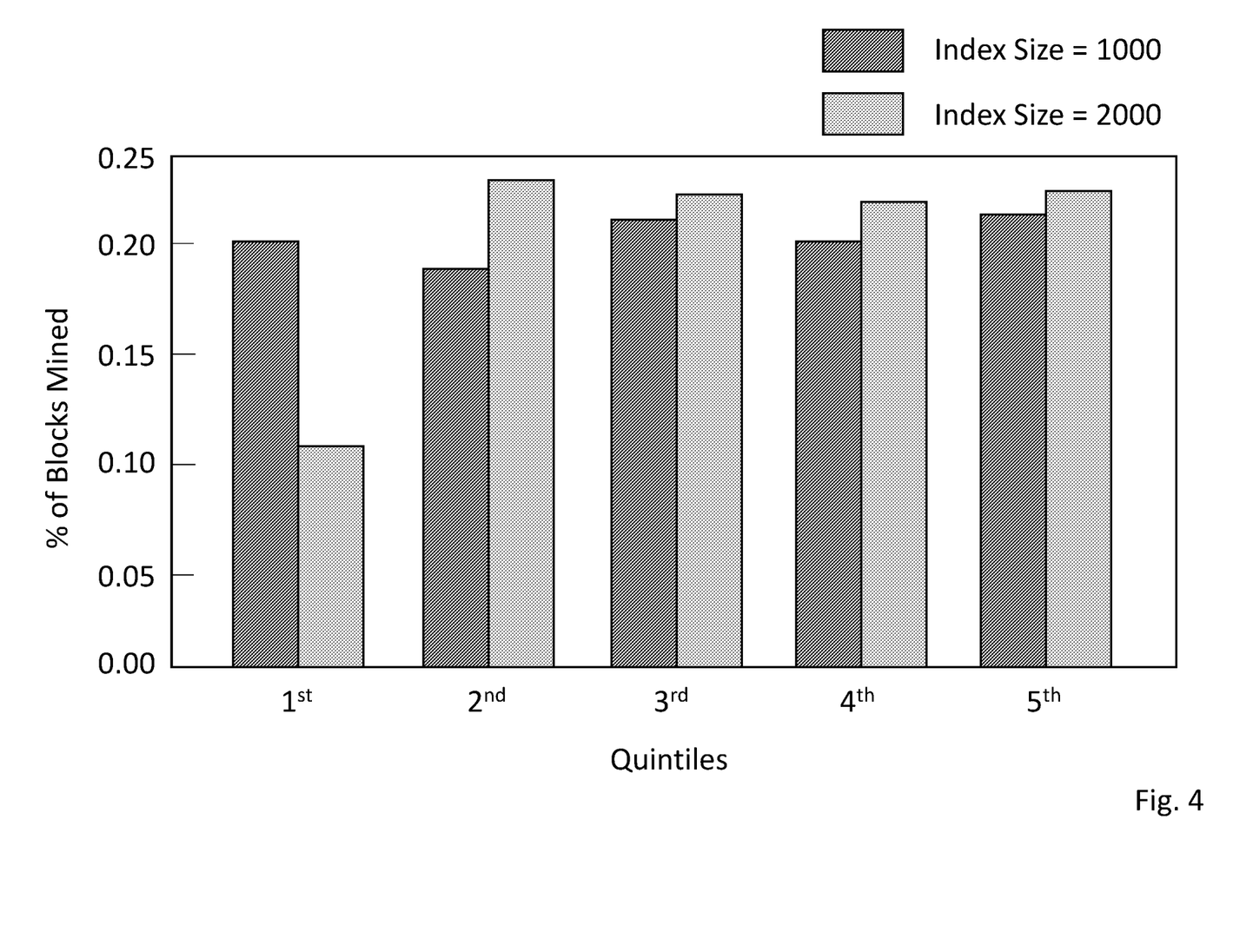
FIG. 4 presents the distribution of mined blocks over all tested miners in accordance with an illustrative embodiment.

FIG. 4 presents the distribution of mined blocks over all tested miners in accordance with an illustrative embodiment. In FIG. 4, the miners are partitioned to quintiles (20% units) based on their bandwidth, using a time span of 180 seconds in which block mining is prohibited. The distribution of mined blocks of size 1000 is almost equally distributed, ranging between 19% of blocks mined by 2nd quintile miners, and a maximum of 21% is mined by 5th quintile miners. Similar results are achieved when using smaller index sizes of 100 and of 500 webpages. In contrast, when using an index size of 2000 webpages, the 1st quintile miners mine only 11.2% of the blocks, while the miners of the other quintiles mine 23.1%, 22.2% 21.6%, and 21.9% of blocks, respectively.

Figure 5:
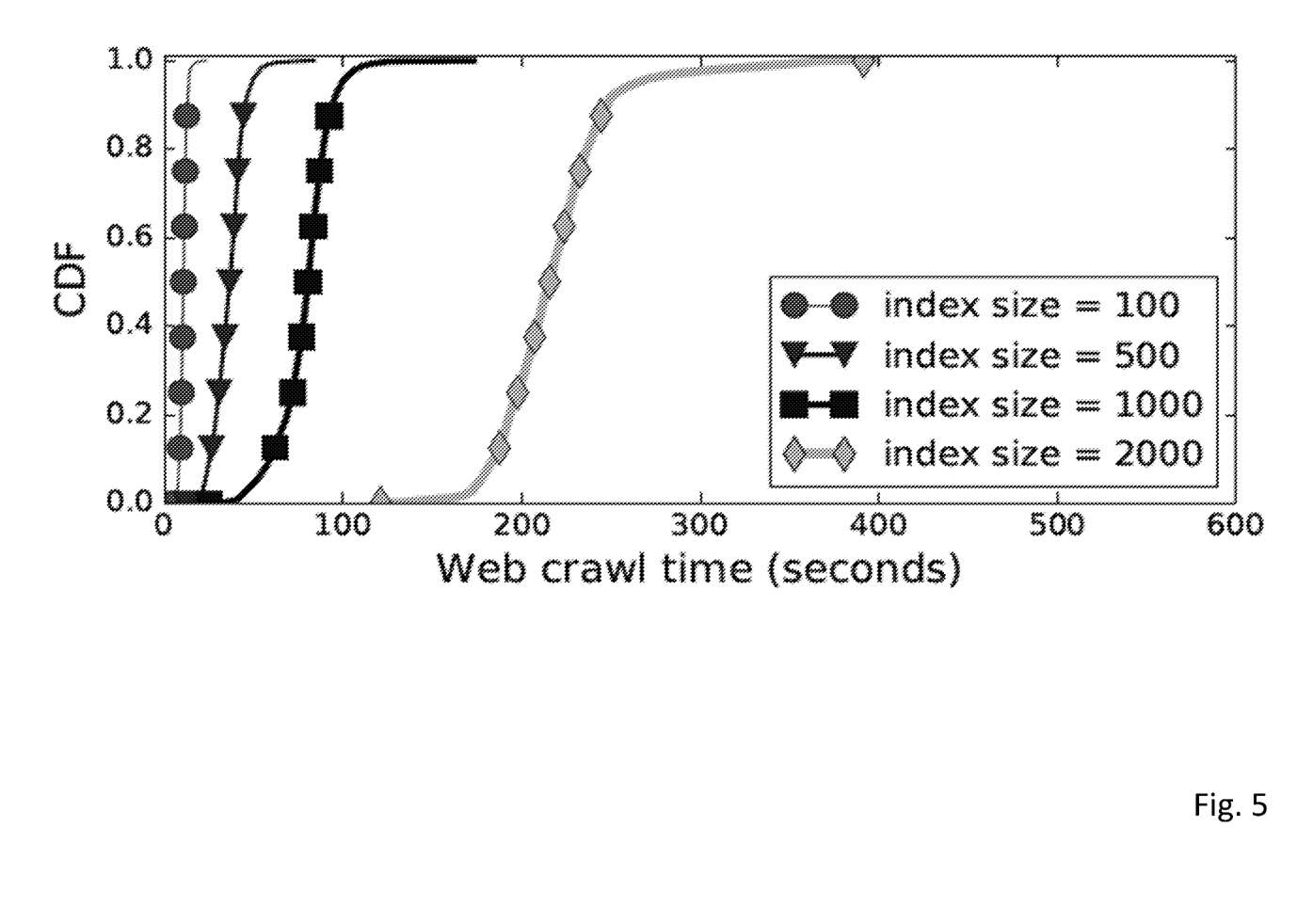
FIG. 5 shows the CDF of the crawl times for the 200 tested miners as a function of the number of webpages crawled in accordance with an illustrative embodiment.

The low success-rate of mining the 1st quintile when using an index size of 2000 webpages is explained by the longer time they require to produce such indices, which often causes them to be ineligible to mine the following block. FIG. 5 shows the CDF of the crawl times for the 200 tested miners as a function of the number of webpages crawled in accordance with an illustrative embodiment. Necessarily, as the number of pages increases, so does the time required for nodes to download them. In the case of an index size of 2000 webpages, it was observed that the low bandwidth miners can spend between 250 and 400 seconds in crawling. This corresponds to the tail shown in the figure for index size of 2000. Hence, such timescales overlap with inter-block timescales shown previously in FIG. 3. Whenever the crawling time exceeds the inter-block times, a miner fails to qualify for mining a block. This explains the reduced performance of low-bandwidth miners for the index size of 2000 in FIG. 4. It is thus concluded that an index of size 2000 may be too large to allow for fair mining. It is further concluded that miner equality and performance can be balanced through the use of an index size of 1000, combined with a time period of 180 seconds in which mining is invalid. However, in alternative embodiments, a different index size and/or time period may be used.

The evaluation also considered the scale's effect on the ability of the proposed system to produce a new block every 10 minutes, for a large-scale network of 100K miners, and the ability of a miner with a capacity of 1 Mbps bandwidth (both upload and download) to participate on equal grounds, despite increased volume of traffic. Upon the mining of a new block, the block is propagated to all miners, followed by its index. According to Bitcoin measurements, the average time required for a block to reach the majority of nodes in the Bitcoin system, over a 9 week period, was 5.9 seconds, and the average block size was 700.7 KB. As blocks of the proposed system are similar in some respects to those used in Bitcoin, and are of comparable size, their propagation across a large network of 100K miners is expected to be similar. As blocks in the proposed system are followed by their indices, it is estimated that their combined propagation to the majority of nodes to be less than 20 seconds, on average. The indices in the proposed system are approximately one half the size of a block on average. However, the indices may reach as much as twice the size of a block in some scenarios.

During the propagation, every miner to receive the block queries the miner of the block, to verify it indeed controls the IP address used for mining. In the event that the miner has a bandwidth of 1 Mbps, it is likely to become a bottleneck. Each such request contains 16 Bytes of the block's digest, yet together with TCP/IP headers the load totals to 2.67 MB for the majority of requests. A low capacity miner will need approximately 21.3 seconds to respond to them. However, as such requests start to arrive to the miner almost immediately after the new block's mining, this time is incurred in parallel to the propagation time, and the completion of both is expected within approximately 25 seconds from the block's publishing time.

Following the block validation and the propagation of both block and index, each miner statistically validates the index, which for a low capacity miner can take ~6.1 seconds, on average. Thus, a new block and its web index can be propagated and validated by the majority of the system, within approximately 30 seconds from the mining of the new block, for a network of 100K miners.

The last factor which might affect scalability is the propagation of all the digests of the indices, sent for every web index produced by the system. Whereas the digests are only 32 bytes long, they incur an overhead which doubles their size when sent individually over TCP. They are thus aggregated by miners prior to their transmission. For a network of 100K miners, each miner downloads ~3.05 MB of hashes during a time span of 10 minutes, on average, which consumes only 0.04 Mbps of the miner's bandwidth. Thus, in addition to empirical evidence, the analysis of the resources involved to mine Webcoins in a network of 100K miners shows that even limited-capacity miners can participate on equal grounds in the proposed mining system.

For a collector to be capable of collecting all the web indices produced by a network of 100K miners, it must be capable of downloading them in the timespan required to mine a new block, i.e., 10 minutes on average. This is because miners have an incentive to publish their index only as long as there is a chance they will need to propagate it, in the event of successful mining. While miners download 20.45 MB of data, on average, to create an index of 1000 webpages, the compressed index itself is approximately 2 orders of magnitude smaller. Thus, for a collector to collect all the indices produced by a network of 100K miners, it downloads 20 GB in the span of 10 minutes, i.e., it requires only a consumer-grade bandwidth of 266 Mbps.

The above-discussed index validation method was also evaluated. In short, each node randomly samples 30 webpages (out of 1000), and opportunistically samples additional webpages, up to four times, based on the validation results. It was computed that there is a 71.7% probability that a valid index will be labeled correctly in the first iteration, relieving most miners from doing additional iterations, and thus reducing both the time required and the load on webpages. The probability increases to 92% by the second iteration, and to 99.36% by the fourth. The resulting load for each webpage indexed, for a network of 100K miners, is only 6.9 requests per second, on average. For a 1 Mbps miner, the validation takes 6.1 seconds, on average.

There is 0.0001% probability that a valid index will be rejected by a miner, and the erroneous miner would amend its mistake when the consecutive block is mined. For a network of 100K miners, the probability for an index to be wrongly rejected by even 0.2% of the network is approximately $10'$, and is expected to occur once every hundreds of thousands of mining years. The probability for an inaccurate index to be validated is very small. For an index in which half of its webpages contain inaccuracies, it is infeasible to be accepted by the network, or even by 0.01% of the network. An almost accurate index, in which 85% of its webpages are accurately indexed, has a probability of 95.8% to labeled invalid by this process. This translates into a probability of $10^{-8}$ to be accepted by 5% of the network. Thus, the proposed system ensures that valid indices are accepted by the network, while invalid indices are rejected. Any forks induced at individual nodes are quickly resolved by the mining of the next block.

The network domain in which the proposed system operates depends on real world state, and is thus susceptible to manipulation. The proposed system therefore includes built in security to prevent fraud. During testing of the system, it has been found that the ability of miners to affect the content of webpages opens the door to the manipulation of their indices, in an attempt to improve their mining success rate. Despite numerous counter-measurements tested, it was found to be infeasible to guarantee that such manipulation does not take place, as the level of control over arbitrary web domains by nodes is unbounded. At the same time, miners may attempt to manipulate the blocks they produce, i.e., to add, remove, and/or reorder a block's transactions, to increase their mining success rate. To that end, miners might produce new public keys and transactions between their own wallets.

The manipulation of either webpages or blocks allows dishonest miners to move the task of mining Webcoins back to the computational domain, where they can explore the space of possible adjustments to webpages and transaction permutations. This space is larger by several orders of magnitude, and can be explored faster by several orders magnitude, than the space explored by a miner in the networking domain (i.e., the space of crawled webpages). A dishonest miner capable of such manipulations voids all of Webcoin's security guarantees, as it is capable of producing blocks at a higher rate than all other nodes combined, and can thus alter the blockchain at will. Webcoin's mining process is thus designed to prevent such dishonesty.

Specifically, the Webcoin system combats fraud by imposing the following principles: i) the proposed system can require the publication of valid web indices, ii) a block's validity must not rely on said indices, iii) a block's validity must not rely on the transactions it contains, nor on any element under its miner's control, iv) a block's transactions cannot be selected or manipulated to affect its miner's future success rate, v) a block's validity must rely on transactions of previous blocks, and vi) transactions of previous blocks, even if no block's validity is yet to rely on them, must not be susceptible to manipulation. In alternative embodiments, fewer, additional, and/or different security principles may be imposed.

To address all six security principles stated above, the proposed system employs three unique principles. First, the system requires a valid web index for a block to be mined, yet the success of the process is not determined by its content. Second, the ability of miners to produce a new block relies on elements outside of their control. Third, Webcoin employs a novel hashing mechanism which breaks the bidirectional relation between blocks. While the hashing mechanism allows a block's validity to rely on its predecessors, the miners of said predecessors are prevented from directly affecting the success in mining the blocks succeeding them.

Figure 6:
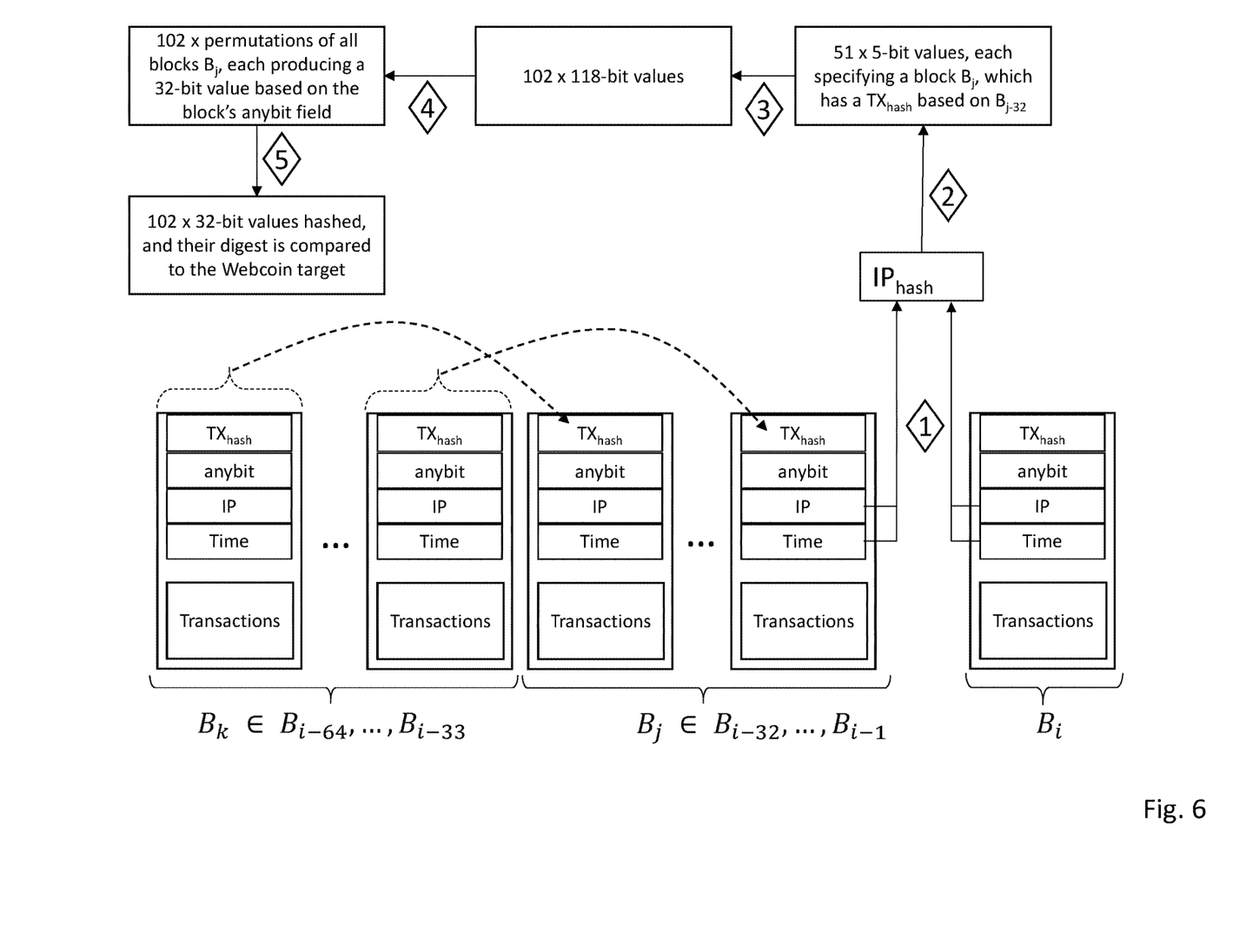
FIG. 6 depicts Webcoin's block mining process, which is repeated every second, in accordance with an illustrative embodiment.

FIG. 6 depicts a block mining process, which is repeated every second, in accordance with an illustrative embodiment. Alternatively, a different period of repetition may be used such as 0.5 seconds, 0.75 seconds, 1.25 seconds, etc. Webcoin utilizes a SHA-256 double-hashing to hash 4 elements in one embodiment. First, every block $B_i$ contains an additional field, which contains the digest yielded by hashing of the entire block preceding it by 32 blocks ($B_{i-32}$), denoted $TX_{hash}$. Second, every block $B_i$ contains an additional 1 bit field, denoted anybit. The value of anybit is randomly selected by the miner, and is introduced to counter pre-computation of future blocks. Third, Webcoin utilizes the current time, in seconds, based on the Coordinated Universal Time (UTC). Fourth, the success of each miner also depends on the hashing of its IP address, and it can be asked to prove its ability to communicate through that IP address in order to validate its block.

As depicted in FIG. 6, the mining of a new block $B_i$ is as follows. First, the IP address of the miner and the current time, in seconds, are hashed with the mining time of and with the IP address of the miner that mined both of which are specified in $B_{i-1}$. The result is denoted $IP_{hash}$. Second, the resulting 256 bit digest is divided into 51 values of 5 bits, discarding the last bit, and each of these values is used as a pointer to a block $B_j$ in the range $B_{i-32}$ to $B_{i-1}$. Third, for each block $B_j$ specified by such a 5 bit value, the block's $TX_{hash}$, which holds the digest yielded from the hashing of block $B_{j-32}$, is divided into two 118 bit binary values and the remaining 20 bits are discarded. Fourth, each such 118 bit binary value is translated to a permutation of the 32 blocks in the range between $B_{j-32}$ and Using each permutation, the anybit fields are extracted from the blocks according to their order, to create a single 32 bit binary value per permutation. Hence, 102 32-bit values are created. Lastly, these 102 values are hashed according to their order, and the resulting digest is compared to Webcoin's target, which determines whether the miner can produce a new block.

Webcoin's hashing procedure serves multiple purposes. First, from the perspective of $B_i$'s miner, its success depends exclusively on its IP address and the current time. It is thus unable to manipulate the block in order to affect its success rate. Second, from the perspective of every miner of a block $B_j \in B_{i-32}, \ldots, B_{i-1}$, i.e, one of the 32 blocks preceding it must accurately include the hashing of block $B_{j-32}$ in $B_j$'s $TX_{hash}$ field. Otherwise, $B_j$ will be rejected by the network. Thus, $B_i$'s miner can only affect the mining of $B_i$ through its selection of anybit. This effect is very limited, as it is bounded to two possible values, 0 and 1, without any guarantees that either value will serve the miner better than the other.

In the edge case, a miner M of infinite computational power and perfect system knowledge, attempting to improve its likelihood to mine block $B_{j+l}$, is twice as likely to select the value to better serve it, in comparison to a coin toss. This does not mean the miner will be able to arbitrarily set itself as the miner of $B_{j+l}$, but, for example, that it will set anybit to 1 if it will shorten the period of time until M is eligible to mine $B_{j+l}$, in comparison to setting it to 0. However, it is extremely likely that a different miner will become eligible prior to M, for both values, a fact M cannot change. Furthermore, M's ability to determine the effect of its selection decreases exponentially for blocks beyond $B_{j+l}$, as their mining depends on anybit values not yet determined, until the value of anybit is known for the 32nd consecutive block. From the perspective of the miners of blocks $B_k \in B_{i-64}, \ldots, B_{i-33}$, they hold the largest possibility space to affect the mining of $B_i$, as their hashing will define the permutations of anybit values to be used in the mining process. However, due to Webcoin's novel mining scheme, this possibility space only affects the permutations of value to be used prior to the selection of these values (i.e., they dictate permutations of anybit fields of blocks which have not been mined yet). By design, a block's hashing can only affect the permutation of values of future blocks.

While the mining procedure does not allow manipulation to affect the mining of $B_i$, it is worth noting that the possibility space it provides through the 102 permutations of 32 bit values exceeds the possibility space of the hash function by more than a hundred orders of magnitude, and thus does not negatively affect the security guarantees. In addition, although a block $B_i$'s transactions do not affect its hashing by design, their hashing is included in $B_{i+32}$, and affects all consecutive blocks in the blockchain. The use of 32 blocks for transactions security is not disproportional to other systems, such as Bitcoin which uses 100 to 120 blocks before a reward can be used. In alternative embodiments, a different number of blocks may be used, such as 20, 30, 40, 50, 75, etc.

In the event that a miner can indeed produce a new block, the miner will report its IP address in a designated field, the timestamp which had produced the new block, the hashing of $B_{i-32}$ in the $TX_{hash}$ field, the resulting digest, and a random bit in the anybit field. The miner will also include transactions in the block, and will publish the newly-mined block to the Webcoin network, along with its Web index. While the entire procedure can be done in advance, the block and index will be rejected by peer miners until the time used for the successful mining had been reached.

Upon receiving a new block, a miner will ensure that it is indeed valid. Blocks can be easily validated by repeating the above process, using the time and IP address specified in the new block. However, in order to assure that the block's miner had indeed produced the block using an IP address under its control, the validating miner sends a single packet to the IP address over a designated port number (Webcoin's current implementation supports one miner per NAT, but other values may be used). Furthermore, in order to assure the transactions contained in the block had not been altered, the packet will include the hashing of the entire block, to which the block's miner will reply with a single packet to confirm both that it indeed controls the IP address, and that the transactions have not been altered.

It is possible for a miner to obtain more than a single IP address, whether legally from ISPs, or illegally, through the use of malicious bots. It is also possible for numerous miners to form large mining pools, and for resource-rich entities, e.g., search engines, to participate in the mining of Webcoin. Discussed below is how these phenomenon affect Webcoin's security model. Similarly to Bitcoin, the reward of a Webcoin miner is proportional to the portion of resources it controls, and any miner to control over 50% of the resources voids all of the Webcoin security guarantees and controls the blockchain. However, unlike Bitcoin, the resources used for Webcoin mining are two-fold: an IP address, and a bandwidth of approximately 1 Mbps. The latter of the two makes Webcoin more resilient to resource aggregation than Bitcoin.

Any Webcoin miner wishing to utilize multiple IP addresses to increase its mining capacity will need to control enough bandwidth to support crawling the different paths required for each IP address, consuming approximately 1 Mbps per IP address. However, the bandwidth resource does not scale similarly to Bitcoin's computational resources. For comparison, a Bitcoin miner using a home desktop can increase its capacity by 8 orders of magnitude, by purchasing a single Antminer S9, and these machines can be easily stacked. For a similar investment of capital, a Webcoin miner using a residential internet connection can only increase it capacity by 2 orders of magnitude, and its ability to scale it much further is uncertain.

While it is expected for resource-rich entities and large mining pools to participate in Webcoin's mining, as is the case with Bitcoin, they do not jeopardize Webcoin's security model any more than they jeopardize Bitcoin's. All miners are constantly competing over the mining of the next block, and must invest ever-growing resources to remain competitive. The investment of considerable resources by such entities will be met by the investment of other miners, which aim to increase their own share of the reward, which prevents the formation of a monopoly.

Thus, described herein is the use of an incentive model to crowdsource complex networking tasks, which are difficult to perform or estimate. Through that, the Webcoin system is able to disrupt key online industries, such as Web search, cloud services, CDNs, and ISPs. Webcoin is a novel distributed digital currency which can only be mined through web indexing, and which provides both the ability and incentives for open large-scale web mining. Webcoin is the first primitive to use networking resources rather than computational. This transition introduced numerous challenges with respect to feasibility, scale, and security, which are addressed herein.

Through evaluation, it has been shown that a Webcoin network, which in one embodiment asks its miners to index 1000 webpages in every block cycle, creates large-scale indices within approximately three days. It is further shown that parties interested in web indices can download them from all Webcoin miners, using a consumer-grade bandwidth. Webcoin ensures the index quality via statistical index verification that minimizes the Webcoin network's validation traffic. Webcoin not only removes the catastrophic energy footprint associated with networks such as Bitcoin, but incentivizes miners to conduct useful work, thus opening novel sustainable crowdsourcing avenues.

Figure 7:
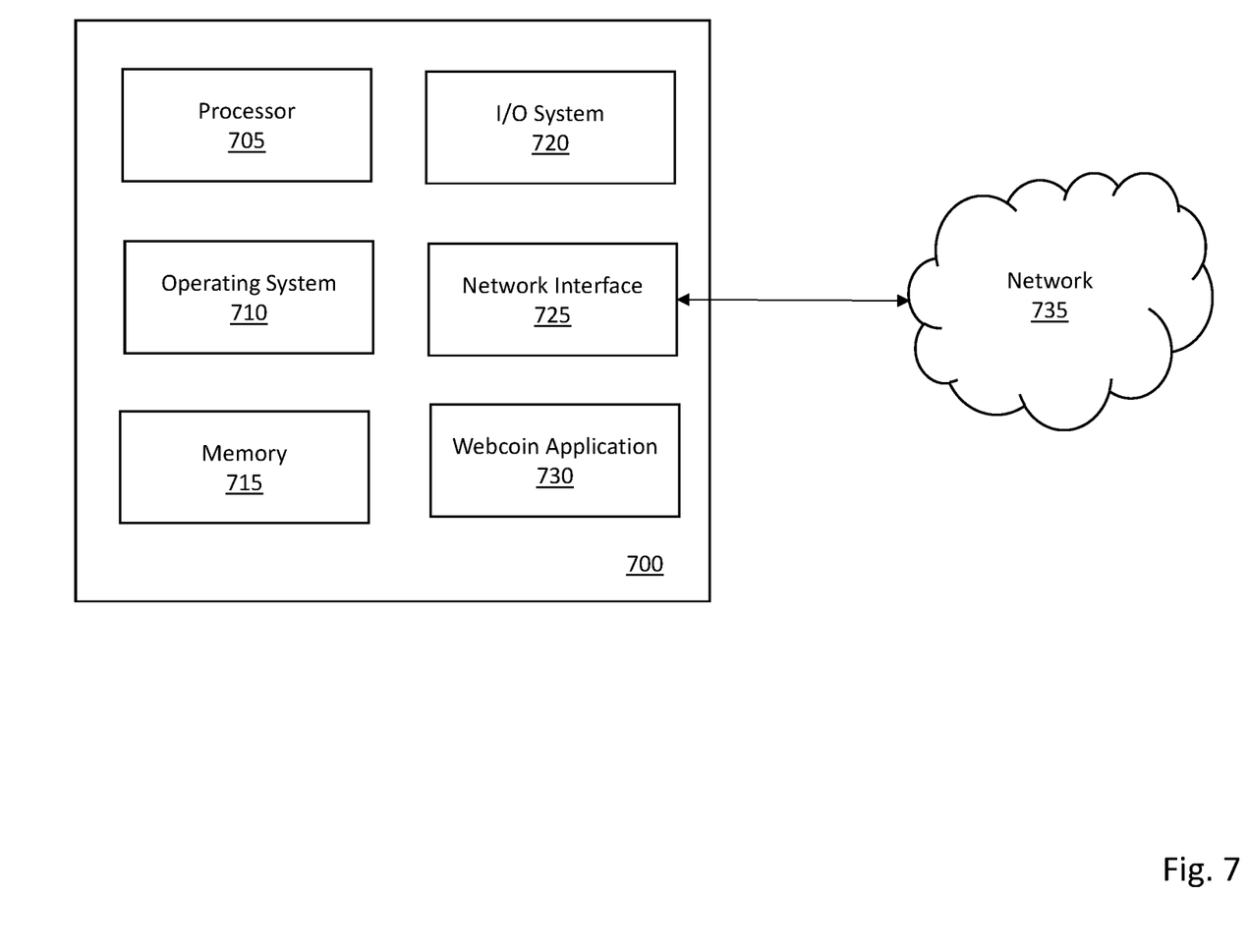
FIG. 7 is a block diagram of a computing device in communication with a network in accordance with an illustrative embodiment.

FIG. 7 is a block diagram of a computing device 700 in communication with a network 735 in accordance with an illustrative embodiment. The computing device 700 can represent a peer node in the Webcoin system, a central controller, a collector, and/or any other type of computing device that participates in or interacts with the proposed system. The computing device 700 includes a processor 705, an operating system 710, a memory 715, an input/output (I/O) system 720, a network interface 725, and a Webcoin application 730. In alternative embodiments, the computing device 700 may include fewer, additional, and/or different components. The components of the computing device 700 communicate with one another via one or more buses or any other interconnect system. The computing device 700 can be any type of networked computing device such as a laptop computer, desktop computer, smart phone, tablet, gaming device, workstation, server, a music player device, etc.

The processor 705 can be any type of computer processor known in the art, and can include a plurality of processors and/or a plurality of processing cores. The processor 705 can include a controller, a microcontroller, an audio processor, a graphics processing unit, a hardware accelerator, a digital signal processor, etc. Additionally, the processor 705 may be implemented as a complex instruction set computer processor, a reduced instruction set computer processor, an x86 instruction set computer processor, etc. The processor is used to run the operating system 710, which can be any type of operating system.

The operating system 710 is stored in the memory 715, which is also used to store programs, user data, network and communications data, peripheral component data, the Webcoin application 730, and other computer-readable operating instructions. The memory 715 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 720 is the framework which enables users and peripheral devices to interact with the computing device 700. The I/O system 720 can include a mouse, a keyboard, one or more displays, a speaker, a microphone, etc. that allow the user to interact with and control the computing device 700. The I/O system 720 also includes circuitry and a bus structure to interface with peripheral computing devices such as power sources, USB devices, peripheral component interconnect express (PCIe) devices, serial advanced technology attachment (SATA) devices, high definition multimedia interface (HDMI) devices, proprietary connection devices, etc.

The network interface 725 includes transceiver circuitry that allows the computing device to transmit and receive data to/from other devices such as remote computing systems, servers, websites, etc. The network interface 725 enables communication through a network 735, which can be one or more communication networks. The network 735 can include a cable network, a fiber network, a cellular network, a wi-fi network, a landline telephone network, a microwave network, a satellite network, etc. The network interface 725 also includes circuitry to allow device-to-device communication such as Bluetooth® communication.

The Webcoin application 730 can include software in the form of computer-readable instructions which, upon execution by the processor 705, performs any of the various operations described herein such as crawling webpages, generating an index of the crawled webpages, hashing results of the index, propagating digests throughout the network, collecting indices, verifying mined blocks, forming blockchains, etc. The Webcoin application 730 can utilize the processor 705 and/or the memory 715 as discussed above. In an alternative implementation, the Webcoin application 730 can be remote or independent from the computing device 700, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system to generate a web index, the system comprising:
   a computing device including a processor and a memory operatively coupled to the memory, wherein the computing device is configured to:
   access a plurality of webpages through a network along a directed route, wherein the directed route is based at least in part on one or more previously mined blocks;
   generate an index corresponding to the plurality of webpages;
   generate a block that includes a hash of a plurality of elements, wherein the plurality of elements includes a digest yielded by hashing of an entire block that precedes the block being generated; and distribute the block and an updated digest corresponding to the index to one or more additional computing devices in the network.

2. The system of claim 1, wherein the computing device receives a request to verify its Internet Protocol (IP) address from at least one of the one or more additional computing devices.

3. The system of claim 1, wherein the computing device is configured to propagate a received index to the one or more additional computing devices.

4. The system of claim 1, wherein the computing device is configured to receive the directed path along which to access the plurality of webpages from a central controller of the system.

5. The system of claim 1, wherein the plurality of elements includes an anybit value that is selected by the computing device or an operator of the computing device.

6. The system of claim 1, wherein the plurality of elements includes an Internet Protocol (IP) address of the computing device.

7. The system of claim 1, wherein the entire block precedes the block being generated by 32 blocks.

8. The system of claim 1, wherein the plurality of elements includes a current time in seconds.

9. The system of claim 1, wherein the block is distributed to the one or more additional computing devices for verification.

10. The system of claim 9, wherein the computing device receives an incentive responsive to a successful verification of the block performed by at least a portion of the one or more additional computing devices.

11. The system of claim 10, wherein the incentive comprises a digital currency.

12. A method of performing web indexing, the method comprising:

accessing, by a networking interface of a computing device, a plurality of webpages along a directed route, wherein the directed route is based at least in part on one or more previously mined blocks;

generating, by a processor of the computing device, an index corresponding to the plurality of webpages;

generating, by the processor, a block that includes a hash of a plurality of elements, wherein the plurality of elements includes a digest yielded by hashing of an entire block that precedes the block being generated; and distributing, by the network interface, the block and an updated digest corresponding to the index to one or more additional computing devices in the network.

13. The method of claim 12, wherein the plurality of elements includes an anybit value that is selected by the computing device or an operator of the computing device and a time in seconds.

14. The method of claim 12, wherein the plurality of elements includes an Internet Protocol (IP) address of the computing device.

15. The method of claim 12, wherein the block is distributed to the one or more additional computing devices for verification.

16. The method of claim 15, further comprising receiving, by the computing device, an incentive responsive to a successful verification of the block performed by at least a portion of the one or more additional computing devices.

* * * * *